S. Soules.
Potato Digger.

Nº 90,404.          Patented May 25, 1869.

Witnesses,
S. H. Wheeler
Geo. W. Wilson

Inventor,
Simon Soules

United States Patent Office.

SIMON SOULES, OF DOWAGIAC, MICHIGAN.

Letters Patent No. 90,404, dated May 25, 1869.

IMPROVEMENT IN POTATO-DIGGERS.

The Schedule referred to in these Letters Patent and making part of the same.

*To all whom it may concern:*

Be it known that I, SIMON SOULES, of Dowagiac, in the county of Cass, and State of Michigan, have invented a new and useful Improvement in Potato-Diggers; and I do hereby declare that the following is a full, clear, and exact description of the same, reference being had to the annexed drawings, making a part of this specification, in which—

A represents the frame, mounted on two separate carrying-wheels B B, and provided with the tongue C.

The bars $a\ a$ are pivoted at the rear end to the inner side of the rails H H of the frame A.

The front end of the bars $a\ a$ are suspended by the chains $o\ o$ and hooks $d\ d$.

Said chains may be let out or taken up, as may be desired, in raising or lowering the digging-device.

$x\ x$ represent the shovels, one of which is placed a little in advance of the other, and both are attached to the under side of the front end of the bars $a\ a$.

Figure 1:
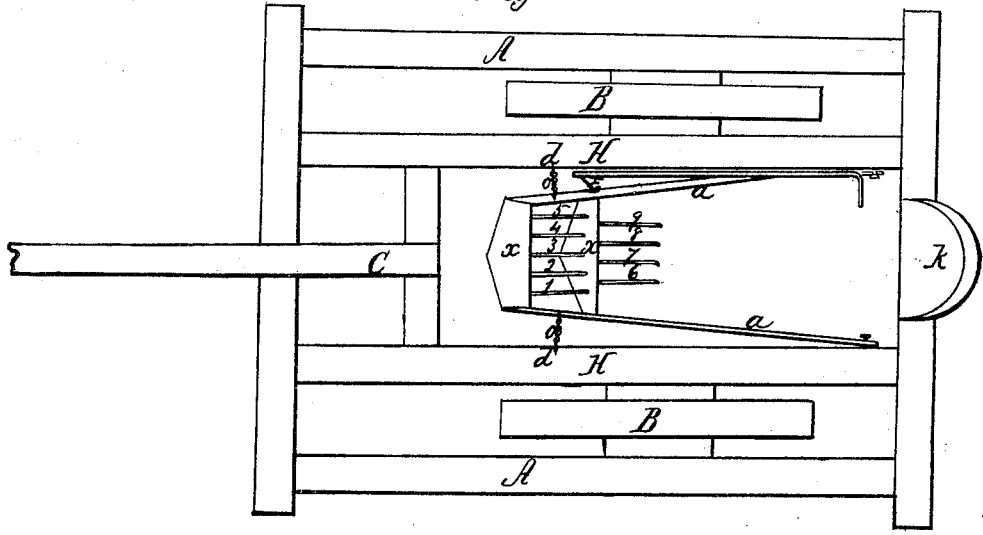
Figure 1 is a top view.
Figure 2:
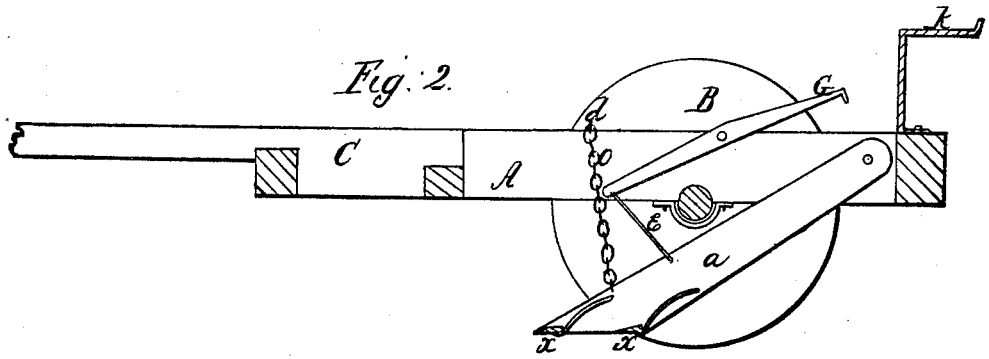
Figure 2 is a longitudinal view through the diameter.

At the rear edge, and from the under side of the shovels $x\ x$, project the teeth, which incline upward and backward, and are represented on the drawings by the figures 1, 2, 3, 4, 5, in the front shovel, and in the rear shovel by the figures 6, 7, 8, 9.

It will be seen that the teeth in the rear shovel stand opposite the centre of the spaces between the teeth in the front shovel, which arrangement causes the rear teeth to comb the ground left uncombed by the front teeth.

The length of the teeth should be such as would reach about to the surface of the ground when the shovels are sufficiently deep in the ground to pass below the potatoes.

It will be seen that the potatoes will be thrown to the top of the ground by the action of the teeth, as the machine is drawn forward, partly by the contact of the teeth with the potatoes, and partly by contact with the roots, by which the potatoes are joined together, and to the vines, drawing under and crowding potatoes, vines, and roots, all to the surface of the ground together.

G represents a lever, pivoted to the frame A, the lower end of which is connected to one of the bars $a$ by means of the rod $e$, and is used to raise the shovels out of the ground, when desired.

$k$ represents the driver's seat, which may be constructed in any of the known forms now in use.

Having thus fully described my invention,

What I claim as new, and desire to secure by Letters Patent, is—

The bars $a\ a$, shovels $x\ x$, and the teeth 1, 2, 3, 4, 5, 6, 7, 8, 9, when constructed, combined, and arranged as set forth.

In testimony that I claim the foregoing, I have hereunto set my hand, this 22d day of January, 1869.

SIMON SOULES.

Witnesses:
  GEO. W. WILSON,
  H. MICHAEL.